May 13, 1958 H. A. MIHM 2,834,367
FUEL CONTROL DEVICE
Filed June 2, 1953 2 Sheets-Sheet 1

INVENTOR.
HERMAN A. MIHM
BY

May 13, 1958  H. A. MIHM  2,834,367
FUEL CONTROL DEVICE
Filed June 2, 1953  2 Sheets-Sheet 2
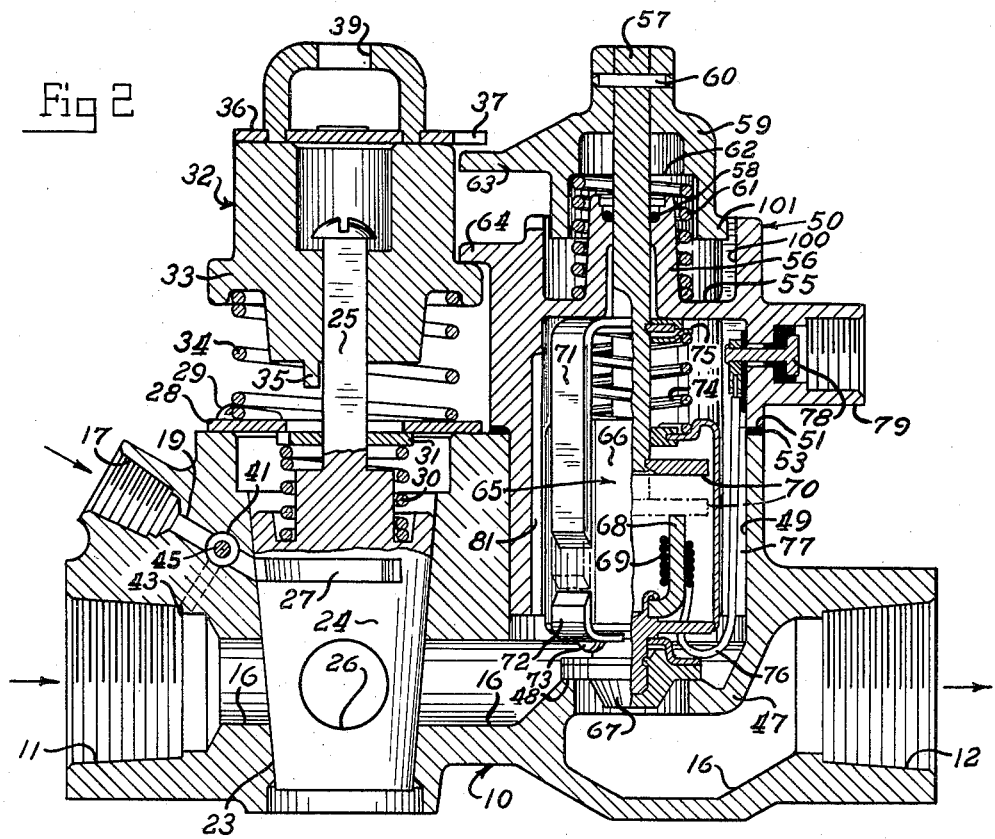
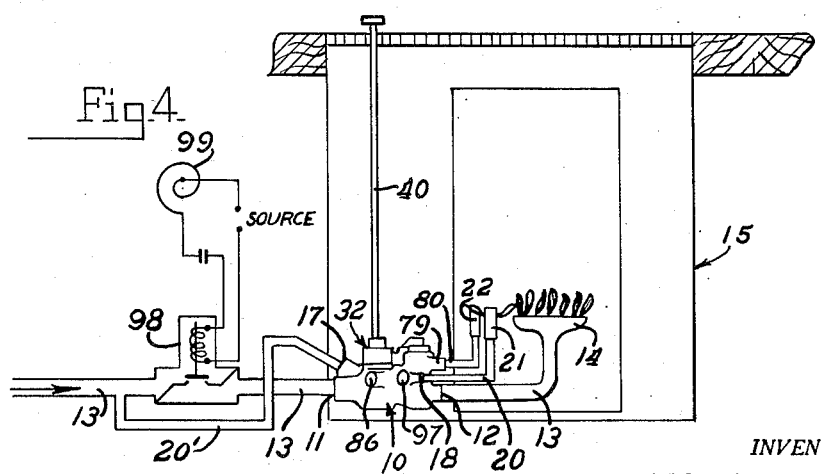
INVENTOR.
HERMAN A. MIHM
BY
Atty's.

United States Patent Office 2,834,367
Patented May 13, 1958

2,834,367

FUEL CONTROL DEVICE

Herman A. Mihm, Wauwatosa, Wis., assignor to Baso Inc., Milwaukee, Wis., a corporation of Wisconsin Application June 2, 1953, Serial No. 359,184

4 Claims. (Cl. 137—66)

This invention relates to improvements in fuel control devices.

It is well known in the art of controlling the flow of fuel to fluid fuel burners to provide safety shut-off devices effective to shut off the supply of fuel to the main burner of the fuel burning apparatus and also, if desired, to the pilot burner upon occurrence of a predetermined condition. Such safety shut-off devices may have electromagnetic control means powered from a thermoelectric generator subject to the heat of the pilot flame to effect 100% shutoff of the fuel in the event of pilot failure. The aforedescribed apparatus, however, does not provide condition responsive, more particularly temperature responsive, control of the fuel burning apparatus. It is, however, the practice to provide a manually operable valve in such systems to afford temperature control. More desirably, however, there may be provided automatic temperature control means. Inclusion of the latter in apparatus of the aforedescribed character, and more particularly conversion of apparatus having merely a manual valve as aforedescribed to apparatus including automatic temperature control means, presents certain problems.

Such a conversion usually includes the addition of an electromagnetically operated valve under the control of a room thermostat. The insertion of an automatically operated valve in the fuel line to the main burner downstream from the safety shut-off valve is impractical for a number of reasons. First, the space limitations are frequently such that there is insufficient room to accommodate the valve, and secondly, a conversion of this type requires difficult and expensive modification in the fuel piping system. On the other hand insertion of the thermoelectrically controlled valve in the fuel line upstream from the conventional safety shut-off device would render the safety shut-off device inoperative for its intended purpose since it would shut off the pilot gas as well as the main burner gas with each cycling of the thermostat. This, of course, would not be a satisfactory arrangement.

It is therefore an object of the present invention to provide an improved fuel control device having safety shut-off means as well as manually operated valve means, said device being so constructed that when it is incorporated in manually controlled fuel burning equipment, the latter can be readily converted to automatic operation without any modification of the fuel lines downstream from said device.

Another object of the invention is to provide an improved fuel control device of the character described having a pilot fuel passage and a main fuel passage which may be separated from each other, the fuel flow through both of said passages being under the control of both the safety shut-off means and the manually operated valve, whereby the main fuel passage may be connected to one fuel source, for example through a thermostatically controlled valve, and the pilot fuel passage may be connected to another fuel source or to the same source at a point upstream from said thermostatically controlled valve, the flow of pilot fuel thus being independent of the operation of the thermostatically controlled valve. The improved device, therefore, permits the insertion of the thermostatically controlled valve into the main fuel line upstream from said device, while at the same time providing safety shut-off of both main and pilot fuel.

Another object of the invention is to provide an improved control device of the character described having a selector valve for selectively providing communication between said main and pilot fuel passages upstream of the manually operated valve and the safety shut-off means, whereby pilot fuel is supplied to the pilot fuel passage from the main fuel passage when said valve is open, closure of said valve isolating the pilot fuel passage from the main fuel passage and permitting fuel supply to the pilot fuel passage from a separate source independently of the fuel flow through the main fuel passage. In either case, however, the improved control device maintains control over the fuel flow through both of said fuel passages.

A more specific object of the invention is to provide an improved control device of the character described wherein the manually controlled valve is located upstream from the safety shut-off means in both the main and pilot fuel passages, so that closure of the manually operated valve shuts off all fuel flow downstream therefrom in both of said passages and thereby permits disassembly of portions of the device or of the fuel system downstream from said valve without requiring shut-off of the fuel at the meter.

Another object of the invention is to provide an improved control device of the character described wherein the safety shut-off means includes an electromagnetically controlled valve in the main fuel passage and a valve in the pilot fuel passage coacting with said electromagnetically operated valve, the pilot fuel valve being movable to closed position upon movement of said electromagnetically operated valve to closed position, thereby providing 100 percent shut-off of the fuel.

Another object of the invention is to provide an improved control device of the character described wherein the safety shut-off means provides main burner fuel flow interruption during resetting, while at the same time retaining the 100 percent shut-off feature.

Another object of the invention is to provide an improved control device of the character described wherein actuation of the resetting mechanism holds the main fuel passage shut-off valve closed and holds the pilot fuel shut-off valve open, whereby only pilot fuel flow is permitted during such actuation, continuation of pilot fuel flow upon release of the reset mechanism being dependent upon opening movement of the main fuel passage shut-off valve by said reset mechanism, the construction being such that the main fuel passage shut-off valve cannot be opened unless the pilot burner is ignited.

Another object of the invention is to provide an improved control device of the character described wherein the electromagnetic operator for the safety shut-off valve includes an electromagnet and an armature which are juxtaposed in open valve position and in reset position, and which are spaced apart a substantial distance in released or closed valve position, there being cam means connected to said electromagnet and armature and positioned for actuation of the pilot fuel passage valve to hold the latter open when the armature and electromagnet are juxtaposed, said cam means being operable to hold the pilot fuel valve open continuously during movement of the electromagnet and armature from reset to open valve position, and to permit closure of said pilot fuel valve with the safety shut-off valve upon predetermined separation of said electromagnet and armature.

Another object of the invention is to provide an improved control device of the character described wherein the safety shut-off valve has a reciprocatably mounted reset means, and the manually operated valve has a turnable valve member which has a "pilot" position in which it shuts off the fuel flow through the main fuel passage and permits fuel flow through the pilot fuel passage, there being an operating member non-rotatably connected to said turnable valve member and movable axially thereof, said operating member having a portion engageable with said reset means for actuation thereof by axial movement of the operating member when said turnable valve member is in "pilot" position only.

With the above and other objects in view, the invention consists of the improved control device and all of its parts and combinations, as set forth in the claims and all equivalents thereof.

In the drawings accompanying and forming a part of this specification wherein one complete embodiment of the invention is illustrated, and wherein like characters of reference indicate the same parts in all of the views:

Figure 2 is a vertical sectional view taken through the improved control device approximately along the line 2—2 of Figure 1, the safety shut-off valve being shown in closed position;

Figure 4 is a semi diagrammatic view of the improved control device incorporated in a fluid fuel burning floor type furnace.

Figures 1, 3:
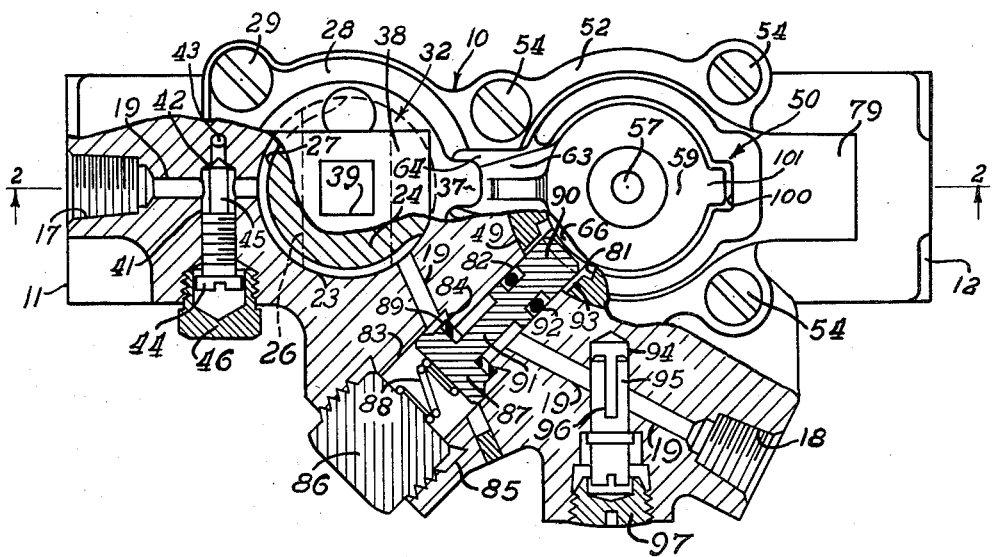
Figure 1 is a plan view of the improved control device, parts being broken away and shown in section, the plug valve and the operating member being positioned in "pilot" position.
Figure 3 is a fragmental vertical sectional view similar to Figure 2 and showing the plug valve and the safety shut-off valve in open position.

Referring to Figures 1 and 2 of the drawing, the numeral 10 indicates a valve body having a main fuel inlet 11 and a main fuel outlet 12. A main fuel passage 16 affords communication between the inlet 11 and outlet 12. Contiguous sections of fluid fuel supply pipe 13 (Figure 4) may be connected to the inlet 11 and outlet 12, and the section connected to the outlet 12 may, for example, lead to the main burner 14 of a fluid fuel burning floor furnace 15 (Figure 4).

The valve body 10 is also provided with a pilot fuel inlet 17 and a pilot fuel outlet 18 (Figure 1). A pilot fuel passage 19, which is separate from the main fuel passage 16, affords communication between the inlet 17 and the outlet 18. A pilot fuel supply pipe 20 may be connected to the outlet 18, and may lead to the pilot burner 21 of furnace 15. The pilot burner 21 is mounted adjacent the main burner 14 and is preferably provided with ports for directing a flame toward said main burner as well as toward the "hot" junction of a thermoelectric generator 22, which is preferably a single thermocouple.

The valve body 10 is formed with a transverse tapered bore 23 which intersects both the main fuel passage 16 and the pilot fuel passage 19. A tapered plug valve member 24 is rotatably seated in the bore 23 in sealing relation therewith, said plug having an axially projecting stem 25 which may be substantially rectangular in transverse section. The plug 24 is formed with a diametric bore 26 which is adapted to register with the main fuel passage 16 when the plug is in one position of rotation. The plug 24 is also formed with a peripheral groove 27 which is adapted to register with pilot fuel passage 19 as hereinafter described.

A centrally apertured cover plate 28 surrounds the stem 25 and closes the larger end of the bore 23, being fixed to the body 10 as by screws 29. A coiled compression spring 30 surrounds the stem 25 and is interposed between the plug 24 and a lock plate 31 which is non-rotatably and axially slidably positioned on the stem 25. The spring 30 urges the plate 31 against the cover 28 and urges the plug 24 axially into the bore 23. An operating member 32 is non-rotatably and axially slidably positioned on the stem 25 and is provided with an annular peripheral flange 33. A coiled compression spring 34 surrounds the stem 25 and is interposed between the cover plate 28 and the annular flange 33. A tang 35 depends from the member 32 adjacent the stem 25 and is engageable with the lock plate 31 upon depression of the member 32 along the stem. The member 32 also has a top plate 36 which is formed with a peripheral projection 37. Fixed to the top plate 36 is an inverted U-shaped member 38 which is preferably formed with a rectangular aperture 39 (Figures 1 and 2) which aperture is adapted to receive the rectangular end portion of a manually operably actuating rod 40 (Figure 4).

A transverse bore 41 (Figures 1 and 2) intersects the pilot fuel passage between the inlet 17 and the bore 23, said bore having an inner end portion of reduced diameter providing an annular valve seat 42. A passage 43 affords communication between the inner end of the bore 41 and the main fuel inlet 11. A selector valve member 44 is threaded into the outer end of the bore 41 and has a reduced diameter inner end portion 45 provided with a conical tip which is adapted to sealingly engage the valve seat 42. The outer end of the bore 41 may be counterbored as shown in Figure 1 to threadedly receive a cap 46.

Between the bore 23 and the main fuel outlet 12 an apertured partition 47 extends across the main fuel passage 16 and is provided with an annular valve seat 48 surrounding the partition aperture. The valve body 10 is formed with a bore 49 coaxial with the valve seat 48, said bore opening into the passage 16 on the upstream side of the valve seat 48, as shown in Figure 2. A fitting 50 which may be tubular has an end portion positioned concentrically within the bore 49. The fitting 50 has an external annular shoulder 51 (Figure 2) and an external flange 52 (Figure 1), the under surface of said flange being coplanar with the surface of said shoulder. An annular gasket 53 surrounds the fitting 50 and is positioned between the upper surface of the valve body 10 and the shoulder 51 and flange 52. Screws 54 extend through suitable apertures in the flange 52 and into the valve body to draw said flange and shoulder toward the body 10 and thereby provide a fluid-tight seal at the gasket 53.

The fitting 50 has a centrally apertured transverse partition 55 which is formed with a coaxial tubular extension 56. The reset stem 57 of an electromagnetically operated safety shut-off mechanism 65 positioned within the fitting 50 projects through the tubular extension 56, and is provided with a fluid-tight seal, for example, the resilient O ring 58, at the upper end of said tubular extension. An inverted cup-shaped member 59 is fixed to the stem 57, as by a pin 60. A coiled compression spring 61 surrounds the stem 57 and tubular extension 56 and is interposed between the partition 55 and an annular shoulder 62 within the member 59, said spring being surrounded by the lower portions of the member 59, which, in turn, are positioned concentrically within the open upper end of the fitting 50. It is apparent that the spring 61 urges the member 59 and stem 57 upwardly away from the partition 55. The member 59 is formed with a projection 63 which extends toward the operating member 32 and is overlapped by the projection 37 of the latter when the parts are in the position shown. The fitting 50 is formed with a projection 64 which overlaps and is engaged by the flange 33 under the bias of the spring 34. The fitting 50 is provided with an internal longitudinal rectangular groove 100, and the member 59 is formed with a rectangular projection which is positioned in said groove and coacts therewith to prevent rotation of the member 59 while permitting axial movement thereof.

The safety shut-off mechanism 65 includes a hood or housing 66 which has reciprocatory movement within the fitting 50 and has a valve disc 67 fixed to its inner end wall as shown in Figure 2, said valve being movable with said hood and cooperable with the annular valve seat 48. An electromagnet having a frame 68 is positioned within the hood 66 and is fixed to the inner end wall thereof, there being a coil 69 wound around the legs of the magnet frame 68. The stem 57 slidably projects through the outer end wall of the hood 66, and fixed to the inner end of said stem within the hood is an armature 70 positioned to coact with the electromagnet.

An L-shaped cam member 71 has one arm fixed to the stem 57 and has its other arm extending axially along the outer surface of the hood 66 as shown in Figure 2. A second L-shaped cam member 72 has one arm fixed to the inner end wall of the hood 66, as by a screw 73, and has its other arm extending a short distance axially along the external surface of the hood 66 toward and in alinement with the cam member 71. The cam members 71 and 72 have divergently bevelled end portions which are in spaced relationship when the parts are in the shut-off position shown in Figure 2. A coiled compression spring 74 surrounds the stem 57 and is interposed between the outer end wall of the hood 66 and a retaining washer 75 on said stem abutting the cam 71. It is apparent that the spring 74 urges the cam 71 toward the partition 55 and urges the hood 66 and valve member 67 toward the valve seat 48. Since the cam 71 is fixed to the stem 57, the force of the spring 74 also urges the armature 70 away from the electromagnet 68.

One end of the electromagnet coil 69 is grounded to the hood 66, and the other end of said coil is connected to an insulated conductor 76 which projects through a suitable aperture in the inner end wall of the hood 66. The conductor 76 extends within a longitudinal groove 77 formed in the side wall of the fitting 50 and is connected to a terminal tip 78 which insulatably extends through a suitable aperture in the fitting 50 externally of the valve body 10. The fitting 50 is provided with an integral internally threaded laterally projecting external socket 79 which surrounds the terminal tip 78 as shown and is adapted to threadedly receive terminal connector means (not shown) on the lead 80 of the thermocouple 22 (Figure 4). The lead 80 may be the concentric type having an outer tubular conductor and having an inner conductor insulated from and positioned concentrically within the outer conductor. The terminal connector means on said lead may be of the type disclosed in Henry J. Alfrey Patent No. 2,276,909, issued on March 17, 1942, said connector means being adapted to connect the inner conductor of the lead 80 with the terminal tip 78 and to ground the outer conductor on the socket 79.

Referring now to Figures 1 and 2, the inner surface of the fitting 50 is formed with a longitudinal rectangular grooves 81 to accommodate the cam members 71 and 72. The valve body 10 is formed with a lateral bore 82 which extends radially with respect to the bore 49 and is alined with the space between the cams 71 and 72 shown in Figure 2. The bore 82 is counterbored as at 83 to provide an annular shoulder 84 which provides an annular valve seat. The bore 82 has an outer counterbore 85 which is threaded to receive a plug 86. As shown in Figure 1, the bore 82 and its counterbore 83 intersect the pilot fuel passage 19 between the tapered bore 23 and the pilot fuel outlet 18, contiguous sections of the passage 19 opening into opposite sides of the valve seat 84.

A valve member 87 is positioned in the counterbore 83 and is urged toward the valve seat 84 by a compression spring 88 interposed between said valve and the plug 86. The valve 87 may have a resilient facing 89 and is provided with a stem 90 axially slidably positioned in the bore 82 and extending through a suitable opening 93 in the side wall of the fitting 50 into the longitudinal groove 81. The stem 90 has a portion of reduced diameter 91 adjacent the valve facing 89, and inwardly of the portion 91 the stem is formed with a peripheral groove to receive a resilient O ring 92. The inner end of the stem is preferably bevelled as shown. It is apparent that when the valve member 87 is seated on the valve seat 84, the pilot fuel passage 19 is closed off thereby. The length of the stem 90 is such that when the valve 87 is seated as shown, the inner end of said stem is positioned adjacent the outer side wall surface of the hood 66. Movement of the cam 71 inwardly or of the cam 72 outwardly positions the particular cam so moved between the inner end of the stem 90 and the hood 66, thereby moving the stem 90 axially outwardly against the bias of the spring 88 and simultaneously moving the valve 87 off the seat 84 to open position.

Between the lateral bore 82 and the pilot fuel outlet 18 the valve body 10 is formed with a lateral bore 94 which intersects the pilot fuel passage 19 as shown in Figure 1. A cylindrical valve member 95 is rotatably positioned in the bore 94, said valve member being formed with a diametric slot 96 which extends axially from the inner end of said valve member. The valve member 95 can serve as a pilot fuel shut off valve, and it can also serve as a metering valve limiting the amount of pilot fuel flowing through the passage 19. The bore 94 may be counterbored as shown to threadedly receive a plug 97.

With further reference to Figure 1, it will be noted that when the valve plug 24 is in the position shown, the peripheral groove 27 affords communication between the portions of the pilot fuel passage 19 opening into the bore 23, while the lower portion of said plug closes off the main fuel passage 16, as also shown in Figure 2. This is known as the "pilot" position of the plug. Rotation of the plug 90° in a counterclockwise direction (as viewed in Figure 1) registers the plug bore 26 with the main fuel passage 16, while the groove 27 continues to permit flow of pilot fuel through the passage 19. This is known as the "on" position of the plug 24. Rotation of the plug 24 an additional 90° in a counterclockwise direction from "on" position places said plug in "off" position wherein it shuts off all fuel flow through both the main fuel passage 16 and the pilot fuel passage 19.

The cover plate 28 and the lock plate are formed with suitable cooperating shoulder means (not shown) for limiting the rotation of the plug between "pilot" and "off" position. There is also intermediate shoulder means (not shown) on the plate 28 engageable by the shoulder means on the lock plate 31 to define the "on" position of the plug 24. Depression of the operating member 32 causes the tang 35 to depress the lock plate 31 and disengage the latter from the intermediate shoulder means so that the plug can be rotated from "on" to "off" position.

The improved fuel control device may be incorporated in a fuel burning device, such as a floor furnace, in which thermostatically controlled operation is not provided in order to keep the initial cost of the furnace as low as possible. In such an installation the pilot fuel inlet 17 is suitably closed, as by a plug (not shown), and the valve member 45 is backed away from the seat 42 to permit pilot fuel to flow into the passage 19 from the main fuel inlet 11 through the passage 43.

To place in operation the furnace or other fuel burning unit in which the improved device is incorporated, the plug valve 24 is rotated to the "pilot" position shown in Figures 1 and 2 by means of the handle 40, the pilot fuel valve 95 being rotated to an open position. The handle 40 is then pressed downwardly thereby depressing the operating member 32 and its projection 37 which, in turn, engages the projection 63 of the member 59 and depresses the latter therewith. Depression of the member 59 causes like movement of the stem 57, cam 71 and armature 70, thus compressing the springs 61 and 74, and moving the cam 71 to the dot-and-dash position shown in Figure 2 wherein its lower end is juxtaposed to the cam 72. In this position the cam 71 engages the valve stem 90 (Figure 1) and holds the valve 87 in open position permitting fuel to flow to the pilot burner 21. Depression of the armature 70 moves the latter into attracted position with respect to the electromagnet 68 as shown in dot-and-dash lines in Figure 2, while at the same time the valve disk 67 is held firmly against the seat 48 to provide flow interruption during the resetting operation.

Upon ignition of the pilot burner 21, the thermocouple 22 is heated and generates sufficient electric energy to hold the armature 70 in attracted relationship with respect to the electromagnet 68 against the force of the compressed spring 74 tending to separte said armature and magnet upon release of the stem 57. The stem 57 is released by release of the handle 40, which release permits the operating member 32 and its projection 37 to rise under the force of the spring 34. This permits the member 59 to be returned to its undepressed positions shown in Figure 2 by the force of spring 61. As the member 59, stem 57 and armature 70 rise upon release, the attractive force of the energized electromagnet holds the latter in contact with the armature so that the electromagnet 68, hood 66 and valve disc 67 rise therewith to the open position shown in Figure 3. As the juxtaposed cams 71 and 72 rise, the cam 71 moves out of engagement with the valve stem 90 and the cam 72 takes its place between said stem and the hood 66. Since the cams 71 and 72 are juxtaposed at all times that the armature 70 and electromagnet are in attracted relationship, the valve member 87 is held open whenever the armature and electromagnet are so related. Hence, during the rising movement of the hood 66, upon release of the stem 57, the valve 87 is kept continuously open. The plug 24 is then rotated 90° in a counterclockwise direction to open position, and with the valve member 67 also in open position, fuel can flow to the main burner 14, said fuel being ignited by the flame of the pilot burner 21. The amount of fuel flowing to the burner 14 may be controlled by rotating of the valve 24 to a selected position by means of the handle 40.

If for any reason the pilot flame should become extinguished, the thermocouple 22 cools, and its electrical output diminishes to the point where its energization of the coil 69 does not create sufficient attractive force to hold the armature 70 and the electromagnet 68 in attracted relationship against the force of the spring 74. As a result, the spring 74 and the fuel pressure pushes the hood 66, electromagnet 68, cam 72 and the valve 67 downwardly from their open positions shown in Figure 3 to their closed positions shown in Figure 2. This seats the valve 67 on the seat 48 to provide safety shutoff of the main burner fuel, and it also moves the cam 72 out of engagement with the valve stem 90, permitting the spring 88 and the pilot fuel pressure to move the valve 87 onto the seat 84, thereby providing safety shutoff of the pilot fuel and affecting 100 percent shut-off of all fuel.

Conversion to thermostatically controlled operation of a manually controlled heating device, such as the furnace 15, having the improved fuel control device incorporated therein, is a relatively simple operation, and it does not require any changes in the fuel piping system downstream of the improved device. An electrosponsive valve, such as a solenoid valve 98 can be inserted in the fuel supply pipe 13 upstream of the improved fuel control device, as shown in Figure 4. The valve 98 may be controlled by a temperature responsive switch 99 connected in series circuit relation therewith and with a source of electric current as shown. The plug (not shown) closing the pilot fuel inlet 17 is then removed, and the valve member 45 is moved to closed position on the seat 42 to isolate the pilot fuel passage 19 from the main fuel passage 16. A section of pilot fuel supply pipe 20' is then connected to the pilot fuel inlet 17 and is connected to the fuel supply pipe 13 at a point upstream from the valve 98 as shown in Figure 4.

The improved fuel control device operates in substantially the same manner in the converted furnace as it does in a manually controlled unit, except that the main and pilot fuel passages 16 and 19 are isolated by the conversion. Thus, the valve 98 can open and close under the control of the switch 99, thereby regulating the fuel flow to the main burner 44 independently of the continuous fuel flow to the pilot burner 21 afforded by the isolated pilot fuel passage 19 and pipe sections 20 and 20'. Where there is insufficient room to place the valve 98 within the casing of the fuel burning unit, it may be placed at any convenient point in the supply pipe 13 outside of said casing.

It will be noted that both the pilot fuel passage 19 and the main fuel passage 16 are intersected by and are under the control of the plug valve member 24. Thus, closure of the valve 24 shuts off all fuel flow downstream therefrom and permits disassembly of any portions of the device downstream from said valve without having to shut off the valve at the meter. It will also be noted that while the reset stem 57 can be depressed by the operating member 32 only when the latter is in "pilot" position, depression of the stem 57 by some other means and inadvertent rotation of the plug valve 24 to "open" position could not result in delivery of fuel to the main burner unless the pilot burner was lighted. The valve 67 cannot be opened by depression and release of the stem 57 unless the electromagnet 68 is sufficiently energized to hold the armature 70 in attracted relationship therewith once the stem is depressed. Thus, flow interruption and safe lighting is effectively provided.

The illustrated form of the invention was selected for the purpose of disclosure only and is not intended to define the limits or scope of the invention. Various changes and modifications may be made without departing from the spirit of the invention, and all of such changes are contemplated as may come within the scope of the claims.

What is claimed as the invention is:

1. A fuel control device comprising, a pilot fuel passage and a main fuel passage separate from said pilot fuel passage, a valve interposed in both the pilot fuel passage and the main fuel passage, electromagnetically controlled safety shutoff means for both of said fuel passages downstream from said first-mentioned valve, and means including a selector valve interposed between said main and said pilot fuel passages upstream from said first-mentioned valve, said selector valve being movable between an open position wherein it affords communication between said main and pilot fuel passages and a closed position wherein such communication is shut off.

2. A fuel flow control device for floor furnaces comprising, a pilot fuel passage, a main fuel passage separate from said pilot fuel passage, a rotatably operable valve interposed in both the pilot fuel passage and the main fuel passage, said valve being rotatable to a "pilot" position shutting off the main fuel passage and permitting fuel flow through the pilot fuel passage, electromagnetically controlled safety shutoff means including a safety shutoff valve in said main fuel passage downstream from said first-mentioned valve and also including a valve in said pilot fuel passage coacting with said safety shutoff valve, said pilot valve being movable from an open position to a closed position by movement of said safety shutoff valve from an open to a closed position thereby providing 100 percent shut off of the fuel, reset means for said safety shutoff means operable upon actuation to open said pilot valve while holding said safety shutoff valve closed, and operating means connected to said first-mentioned valve for rotation thereof from a remote position, said operating means including a member positioned for engagement with said reset means only when said first-mentioned valve is in said "pilot" position, whereby said reset means can be actuated by said operating means from a remote position only when said first-mentioned valve is in said "pilot" position.

3. A fuel flow control device comprising, a pilot fuel passage, a main fuel passage separate from said pilot fuel passage, a safety shutoff valve in said main fuel passage, a pilot fuel valve in said pilot fuel passage, electromagnetic means comprising a magnet core member operatively associated with said safety shutoff valve and an armature member for cooperation with said core member, means biasing said safety shutoff valve to open position, means biasing said core member and said armature to unattracted relative positions and said safety shutoff valve to closed position against the biasing means therefor, a valve stem for said pilot valve, means biasing said pilot valve to closed position, an elongated cam member having one end fixed relative to said armature member and the other end formed with a beveled portion, a second cam member fixed to said core member and formed with a beveled portion, and reset means actuatable from an initial position to move said armature from unattracted to attracted position relative to said core member, actuation of said reset means effecting movement of said elongated cam member to cause the beveled portion thereof to engage said pilot valve stem and cam open said pilot valve against the bias thereof, return of said reset means to its initial position while said electromagnetic means is energized permitting the bias of said safety shutoff valve to move the same from closed to open position, such movement of said core member and armature effecting movement of said elongated cam member out of engagement with said pilot valve stem and movement of said second cam member to cause the beveled portion thereof to cam open said pilot valve, whereby both said safety shutoff valve and pilot valve are retained in open position during energization of said electromagnetic means.

4. A fuel flow control device for floor furnaces comprising, a pilot passage, a main fuel passage separate from said pilot fuel passage, a rotatably operable plug valve interposed in both the pilot fuel passage and the main fuel passage, said plug valve being rotatable to a "pilot" position shutting off the main fuel passage and permitting fuel flow through the pilot fuel passage, a safety shutoff valve in said main fuel passage, a pilot fuel valve in said pilot fuel passage, electromagnetic means comprising a magnet core member operatively associated with said safety shutoff valve and an armature member for cooperation with said core member, means biasing said safety shutoff valve toward an open position, means biasing said core member and said armature to unattracted relative positions and said safety shutoff valve to closed position against the biasing means therefor, a valve stem for said pilot valve, means biasing said pilot valve to closed position, an elongated cam member having one end fixed relative to said armature member and the other end formed with a beveled portion, a second cam member fixed to said core member and formed with a beveled portion, reset means actuatable from an initial position to move said armature from unattracted to attracted position relative to said core member, actuation of said reset means effecting movement of said elongated cam member to cause the beveled portion thereof to engage said pilot valve stem and cam open said pilot valve against the bias thereof, return of said reset means to its initial position while said electromagnetic means is energized permitting the bias of said safety shutoff valve to move the same from closed to open position, such movement of said core member and armature effecting movement of said elongated cam member out of engagement with said pilot valve stem and movement of said second cam member to cause the beveled portion thereof to cam open said pilot valve, and operating means connected to said plug valve for rotation thereof from a remote position, said operating means including a member positioned for engagement with said reset means only when said plug valve is in said "pilot" position, whereby said reset means can be actuated by said operating means from a remote position only when said plug valve is in said "pilot" position.

References Cited in the file of this patent

UNITED STATES PATENTS

| | | |
|---|---|---|
| 435,488 | Elton | Sept. 2, 1890 |
| 1,616,287 | Stone | Feb. 1, 1927 |
| 2,198,451 | Cornell | Apr. 23, 1940 |
| 2,245,834 | Sparrow | June 17, 1941 |
| 2,403,611 | Ray | July 9, 1946 |
| 2,588,179 | Thornberry | Mar. 4, 1952 |
| 2,591,897 | Weber | Apr. 8, 1952 |
| 2,658,515 | Jackson | Nov. 10, 1953 |
| 2,658,686 | Caparone | Nov. 10, 1953 |